(12) United States Patent
Park

(10) Patent No.: US 9,606,849 B2
(45) Date of Patent: Mar. 28, 2017

(54) WATCHDOG APPARATUS AND CONTROL METHOD THEREOF

(71) Applicant: HYUNDAI MOBIS CO., LTD., Seoul (KR)

(72) Inventor: Jaehyun Park, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 141 days.

(21) Appl. No.: 14/477,742

(22) Filed: Sep. 4, 2014

(65) Prior Publication Data

US 2015/0095724 A1 Apr. 2, 2015

(30) Foreign Application Priority Data

Oct. 2, 2013 (KR) ........................ 10-2013-0118166

(51) Int. Cl.
*G06F 11/07* (2006.01)
*G05B 23/02* (2006.01)

(52) U.S. Cl.
CPC ...... *G06F 11/0757* (2013.01); *G05B 23/0221* (2013.01); *G06F 11/0706* (2013.01)

(58) Field of Classification Search
CPC . G06F 11/0757; G06F 11/0736; G06F 9/3885
See application file for complete search history.

(56) References Cited

U.S. PATENT DOCUMENTS

| | | | | |
|---|---|---|---|---|
| 6,018,291 A * | 1/2000 | Marble | ................... | B60R 25/04 180/287 |
| 7,234,159 B1 * | 6/2007 | Fox | ........................ | G06F 21/76 726/20 |
| 2009/0027243 A1 * | 1/2009 | Leung et al. | ........... | H01L 23/48 341/100 |
| 2010/0161845 A1 * | 6/2010 | Vyshetski et al. | ...... | G06F 13/28 710/22 |
| 2013/0140289 A1 * | 6/2013 | Baratier | ................... | A61C 7/36 219/121.83 |

FOREIGN PATENT DOCUMENTS

KR 10-2013-0009086 A 1/2013

* cited by examiner

*Primary Examiner* — Jigar Patel

(57) ABSTRACT

The present invention provides a watchdog apparatus in which a main MCU and a sub MCU are connected by SPI communication, including: a token generating unit which generates a seed value and generates at least two tokens using the seed value; a watchdog signal generating unit which generates a watchdog signal corresponding to the generated token; a signal determining unit which determines whether the generated watchdog signal is in a normal state and thus provides an advantageous effect which may detect an abnormality of the MCU only using a software logic without providing an additional configuration.

7 Claims, 7 Drawing Sheets

FIG. 5

| 4bit watchdog TOKEN | 8Bit WD TOKEN response 0 | 8Bit WD TOKEN response 1 | 8Bit WD TOKEN response 2 | 8Bit WD TOKEN response 3 |
|---|---|---|---|---|
| 0 x 0 | FF | 0F | F0 | 0 |
| 0 x 1 | B0 | 40 | BF | 4F |
| 0 x 2 | E9 | 19 | E6 | 16 |
| 0 x 3 | A6 | 56 | A9 | 59 |
| 0 x 4 | 75 | 85 | 7A | 8A |
| 0 x 5 | 3A | CA | 35 | 05 |
| 0 x 6 | 63 | 93 | 6C | 9C |
| 0 x 7 | 2C | DC | 23 | D3 |
| 0 x 8 | D2 | 22 | DD | 2D |
| 0 x 9 | 9D | 6D | 9D | 62 |
| 0 x A | C4 | 34 | CB | 3B |
| 0 x B | 8B | 7B | 84 | 74 |
| 0 x C | 58 | A8 | 57 | A7 |
| 0 x D | FF | E7 | 18 | E8 |
| 0 x E | 4E | BE | 41 | B1 |
| 0 x F | 1 | F1 | 0E | FE |

WATCHDOG APPARATUS AND CONTROL METHOD THEREOF

CROSS-REFERENCE TO RELATED APPLICATIONS

This application claims priority to and the benefit of Korean Patent Application No. 10-2013-0118166 filed in the Korean Intellectual Property Office on Oct. 2, 2013, the entire contents of which are incorporated herein by reference.

TECHNICAL FIELD

The present invention relates to a watchdog apparatus and a control method thereof and more particularly, to a watchdog apparatus which determines whether an MCU is in a normal state and a control method thereof.

BACKGROUND ART

An important part in electronic control of a vehicle is performed by a micro control unit (hereinafter, abbreviated as MCU). Therefore, failure of the MCU may cause results such as a driver and/or passenger fatalities and vehicle damage.

Therefore, it is very important to detect abnormality of MCU in order to increase the safety of the vehicle. There is a watchdog apparatus as an apparatus which detects the abnormality of the MCU.

The watchdog apparatus transmits and receives a watchdog signal and determines whether the received watchdog signal is received as predetermined data in a predetermined time.

Such a watchdog apparatus is disclosed in Korean Unexamined Patent Application Publication No. 10-2013-0009086 (published on Jan. 23, 2013, hereinafter, referred to as Patent Document 1). Patent Document 1 discloses a configuration in that after initializing a watchdog state, a state is transited between 000 and 111 and when a normal watchdog signal is input, the watchdog state forwardly moves by one step and when an abnormal watchdog signal is input, the watchdog state backwardly moves by two steps to increase reliability of the watchdog signal.

However, according to such a configuration, there is no way to check the stability of a computational operation of the MCU so that the configuration depends on a feedback signal for an external output value. According to this manner, a physical time in accordance with decision logic is wasted and thus delay is caused. Further, it is difficult to determine specific information on a failure area.

SUMMARY OF THE INVENTION

The present invention has been made in an effort to provide a watchdog apparatus which may detect whether an MCU is abnormal by only using software logic without having additional configurations and a control method thereof.

The present invention has been made in an effort to further provide a watchdog apparatus which provides specific information on a failure area of the MCU and a control method thereof.

An exemplary embodiment of the present invention provides: a watchdog apparatus in which a main MCU and a sub MCU are connected by SPI communication, including: a token generating unit which generates a seed value and generates at least two tokens using the seed value; a watchdog signal generating unit which generates a watchdog signal corresponding to the generated token; a signal determining unit which determines whether the generated watchdog signal is in a normal state.

The token generating unit may generate the token by a pseudo random number generating algorithm.

The watchdog signal generating unit may time-sequentially generate the watchdog signal in accordance with the token.

The watchdog signal generating unit may generate the watchdog signals in accordance with a first token which is allocated to a module which initializes the MCU, a second token which is allocated to a module which inputs a signal and performs a decision logic, a third token which is allocated to a module which performs actuation and fail-safe operation and a fourth token which is allocated to a module which stores and finishes a diagnostic trouble code (DTC).

Another exemplary embodiment of the present invention provides a control method of a watchdog apparatus in which a main MCU and a sub MCU are connected by SPI communication, including: generating a seed value and generating at least two tokens using the seed value; generating a watchdog signal corresponding to the generated token; and determining whether the generated watchdog signal is in a normal state.

In the generating of a seed value and tokens, the token may be generated by a pseudo random number generating algorithm.

In the generating of a watchdog signal, the watchdog signal may be time-sequentially generated in accordance with the token.

In the generating of a watchdog signal, the watchdog signals may be generated in accordance with a first token which is allocated to a module which initializes the MCU, a second token which is allocated to a module which inputs a signal and performs a decision logic, a third token which is allocated to a module which performs actuation and fail-safe operation, and a fourth token which is allocated to a module which stores and finishes a diagnostic trouble code (DTC).

According to the watchdog apparatus and a control method thereof according to the exemplary embodiment of the present invention, a configuration in which at least two tokens are generated and watchdog signals corresponding to the tokens are generated to determine whether the generated watchdog signal is in a normal state is provided so that it is possible to detect whether the MCU is abnormal by only using software logic without having additional configuration.

Furthermore, according to the watchdog apparatus and a control method thereof according to the exemplary embodiment of the present invention, the tokens are allocated in accordance with a software structure division so that specific information on an erroneously operated area of the MCU may be determined.

BRIEF DESCRIPTION OF THE DRAWINGS

FIG. 5 is a table illustrating a watchdog signal value for every token.

DETAILED DESCRIPTION OF THE INVENTION

Figure 1:
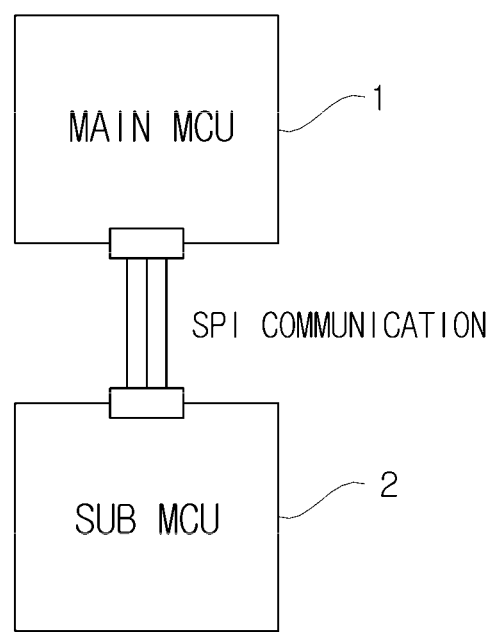
FIG. 1 is a view illustrating a main MCU and a sub MCU which are connected by SPI communication.

Hereinafter, exemplary embodiments of the present invention will be described in detail with reference to the accompanying drawings. In the figures, it should be noted that even though the parts are illustrated in different drawings, it should be understood that like reference numerals refer to like parts of the present invention throughout the several figures of the drawing. Furthermore, hereinafter, exemplary embodiments of the present invention will be described. However, it should be understood that the technical spirit of the invention is not limited to the specific embodiments, but may be changed or modified in various ways by those skilled in the art.

FIG. 1 is a view illustrating a main MCU and a sub MCU which are connected by SPI communication.

As illustrated in FIG. 1, a main MCU 1 and a sub MCU 2 are connected by SPI communication.

Figure 2:
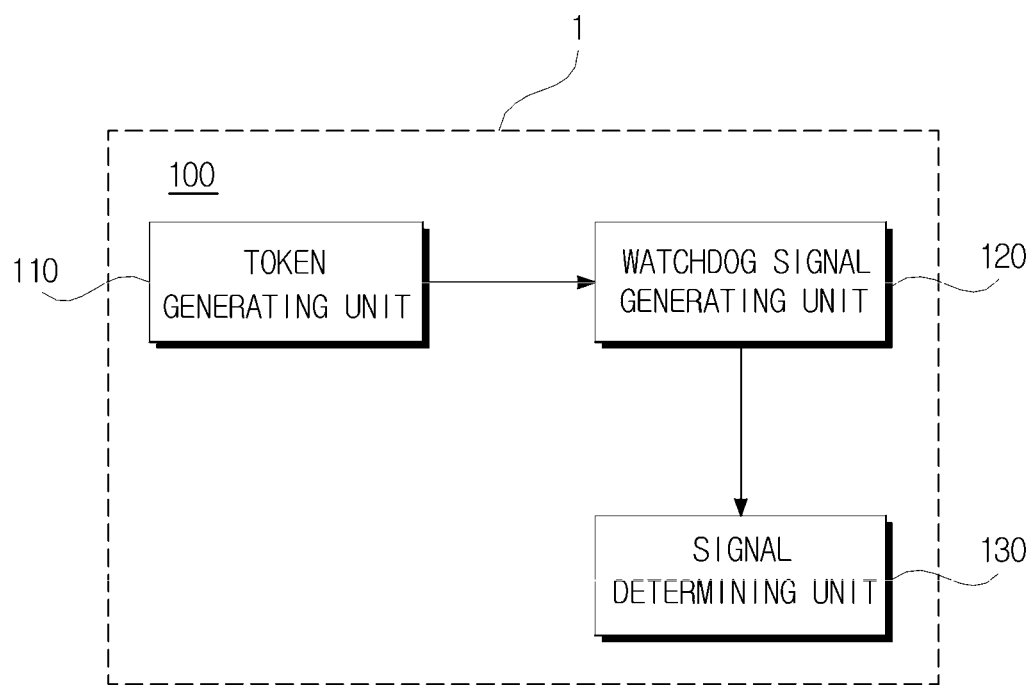
FIG. 2 is a block diagram illustrating a watchdog apparatus according to an exemplary embodiment of the present invention.

FIG. 2 is a block diagram illustrating a watchdog apparatus according to an exemplary embodiment of the present invention.

Referring to FIG. 2, a watchdog apparatus 100 according to an exemplary embodiment of the present invention may include a token generating unit 110, a watchdog signal generating unit 120, and a signal determining unit 130. Such a watchdog apparatus 100 may be implemented in the main MCU 1.

Figure 3:
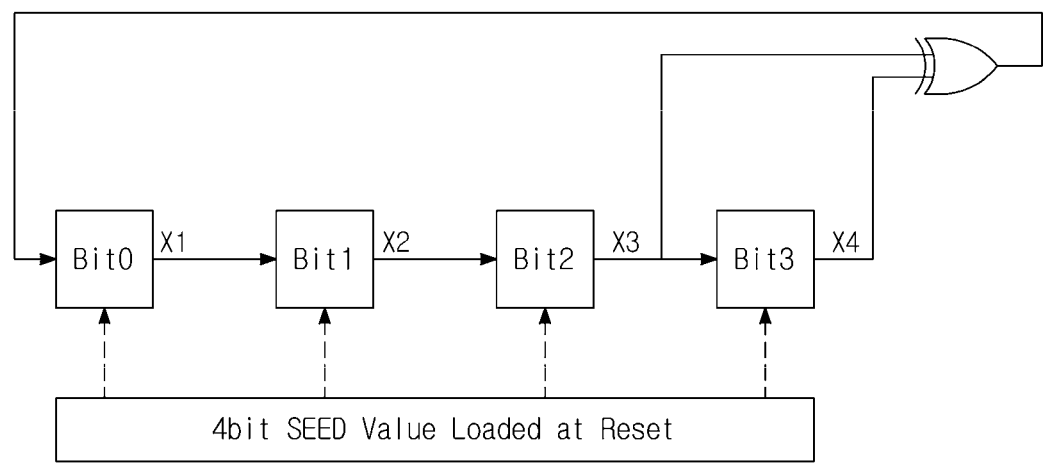
FIG. 3 is a view illustrating a pseudo random number generating algorithm.
Figure 4:
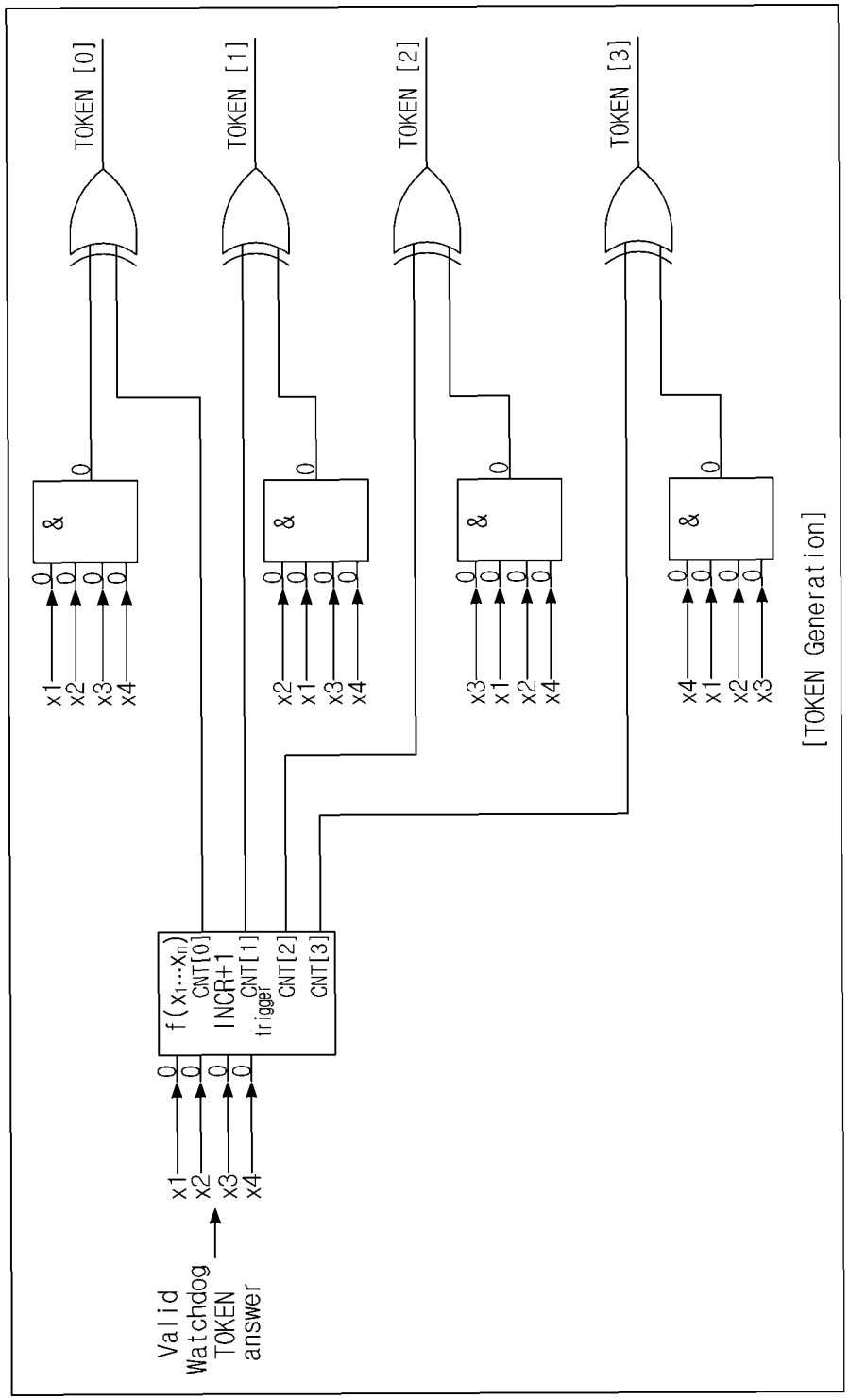
FIG. 4 is a view illustrating a token generating unit.

FIG. 3 is a view illustrating a pseudo random number generating algorithm, FIG. 4 is a view illustrating a token generating unit, and FIG. 5 is a table illustrating a watchdog signal value for every token.

The token generating unit 110 generates a seed value and generates at least two tokens using the generated seed value. In this case, the token may be generated through a pseudo random number generating algorithm as illustrated in FIG. 3 and may be calculated by an arithmetic logic of $Y=X4+X3+1$.

Here, numbers which are randomly generated may generate a watchdog signal as illustrated in Table of FIG. 5 by the watchdog signal generating unit 120 illustrated in FIG. 2.

The signal determining unit 130 determines whether the generated watchdog signals are in a normal state. When the numbers in the table of FIG. 5 are transmitted or received by the SPI communication, if the numbers are transmitted or received as predetermined data by a predetermined sequence in a predetermined timing, the watchdog signal may be determined to be in a normal state. However, when the watchdog signal is not input in the predetermined timing or wrong data is transmitted or received, the state of the watchdog signal is determined to be abnormal so that a safety state may be lowered by one step.

Figure 6:
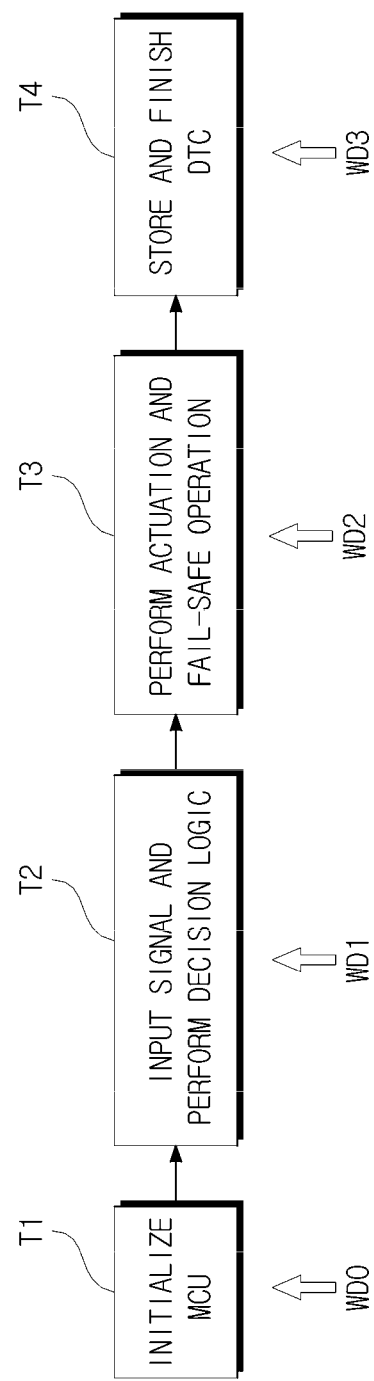
FIG. 6 is a view illustrating tokens which are allocated to a software loop module.

In the meantime, the watchdog signal generating unit 120 may time-sequentially generate the watchdog signals in accordance with individual tokens. Furthermore, the token may be generated to be allocated into an important sequence step of the software logic. FIG. 6 is a view illustrating tokens which are allocated to a software loop module.

Specifically, the token generating unit 110 may generate a total of four tokens, such as a first token T1 which is allocated to a module which initializes the MCU, a second token T2 which is allocated to a module which inputs a signal and performs a decision logic, a third token T3 which is allocated to a module which performs actuation and fail-safe operation, and a fourth token T4 which is allocated to a module which stores and finishes a diagnostic trouble code.

The watchdog signal generating unit 120 may generate watchdog signals WD0, WD1, WD2, and WD3 corresponding to the first token T1, the second token T2, the third token T3, and the fourth token T4.

Figure 7:
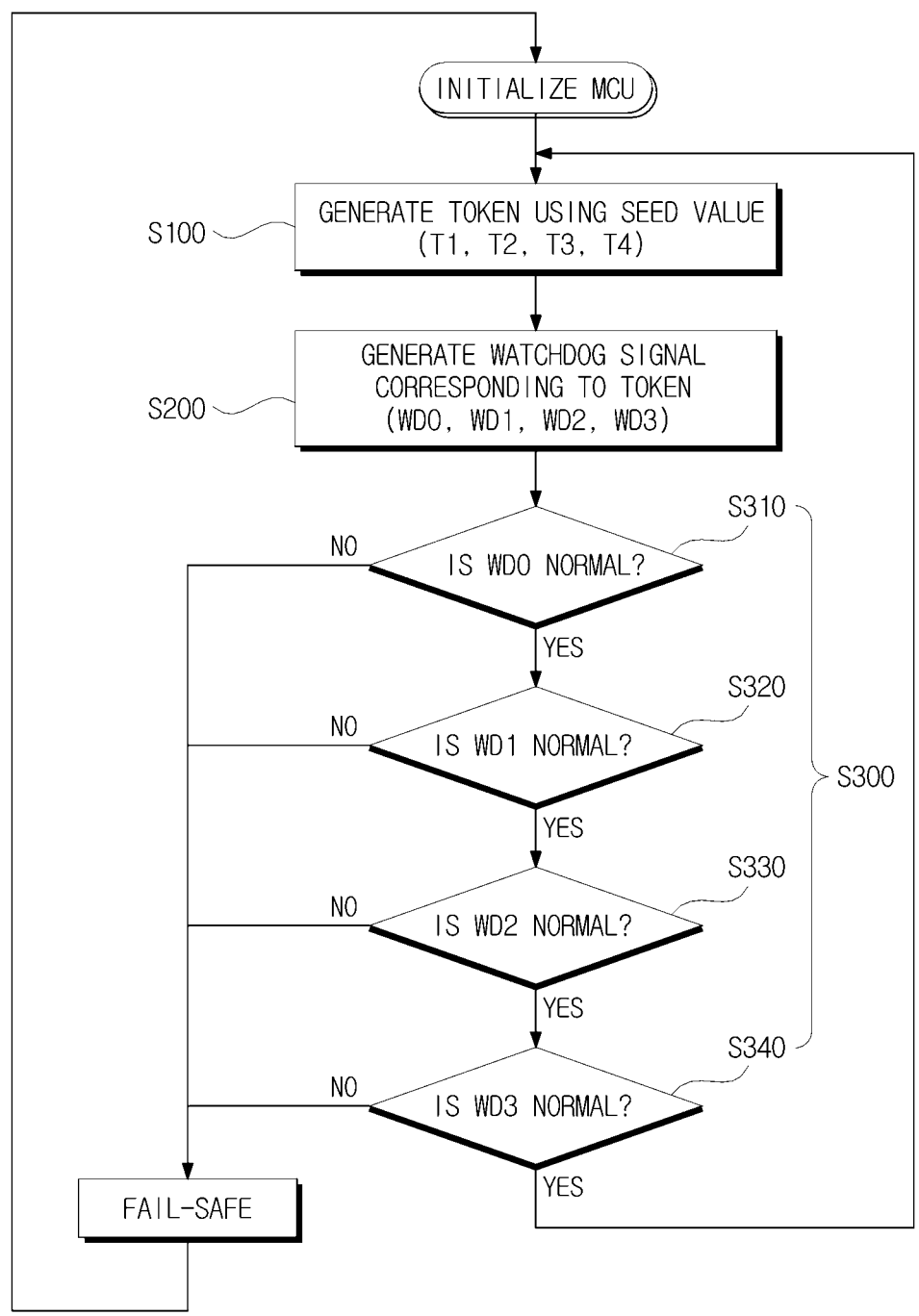
FIG. 7 is a flowchart illustrating a control method of a watchdog apparatus according to an exemplary embodiment of the present invention.

FIG. 7 is a flowchart illustrating a control method of a watchdog apparatus according to an exemplary embodiment of the present invention.

Referring to FIG. 7, in a control method of a watchdog apparatus according to an exemplary embodiment of the present invention, the token generating unit 110 generates a seed value and generates at least two tokens T1, T2, T3, and T4 using the generated seed value in step S100.

Next, the watchdog signal generating unit 120 generates watchdog signals WD0, WD1, WD2, and WD3 in accordance with the generated tokens T1, T2, T3, and T4 in step S200.

Next, the signal determining unit 130 sequentially determines whether the watchdog signals WD0, WD1, WD2, and WD3 are in a normal state in steps S310 to S340.

Accordingly, even though the fail-safe operation is performed, it is possible to determine a location where the watchdog signal is fixed and immediately notice an area of the software where an error occurs.

For example, when the watchdog signal WD2 is determined to be abnormal and the fail-safe operation is performed thereon, it is noticed that an error occurs in the actuation and the fail-safe area T3.

The above description illustrates a technical spirit of the present invention as an example and various changes, modifications, and substitutions become apparent to those skilled in the art within a scope of an essential characteristic of the present invention. Therefore, as is evident from the foregoing description, the exemplary embodiments and accompanying drawings disclosed in the present invention do not limit the technical spirit of the present invention and the scope of the technical spirit is not limited by the exemplary embodiments and accompanying drawings. The protection scope of the present invention should be interpreted based on the following appended claims and it should be appreciated that all technical spirits included within a range equivalent thereto are included in the protection scope of the present invention.

What is claimed is:

1. A watchdog apparatus comprising:
   a token generating unit which generates a seed value and generates a plurality of tokens using the seed value, each of the generated plurality of tokens being allocated to a corresponding module associated with an operation of a micro-control unit (MCU);
   a watchdog signal generating unit which generates a plurality of watchdog signals corresponding to the generated plurality of tokens, respectively; and
   a signal determining unit which determines whether each of the generated plurality of watchdog signals is in a normal state,
   wherein the watchdog signal generating unit time-sequentially generates the plurality of watchdog signals, and wherein the watchdog signal generating unit generates the plurality of watchdog signals in accordance with a first token being allocated to a first module which initializes the MCU, a second token being allocated to a second module which inputs a signal and performs a decision logic, a third token being allocated to a third module which performs actuation and a fail-safe operation, and a fourth token being allocated to a fourth module which stores and finishes a diagnostic trouble code (DTC).

2. The watchdog apparatus of claim 1, wherein the token generating unit generates each of the plurality of tokens using a pseudo random number generating algorithm.

3. The watchdog apparatus of claim 1, wherein the watchdog apparatus is implemented in a main MCU, and the main MCU communicates with a sub MCU using Serial Peripheral Interface (SPI).

4. A control method of a watchdog apparatus comprising:
generating a seed value and generating a plurality of tokens using the seed value, each of the generated plurality of tokens being allocated to a corresponding module associated with an operation of a micro-control unit (MCU);
generating a plurality of watchdog signals corresponding to the generated plurality of tokens, respectively; and
determining whether each of the generated plurality of watchdog signals is in a normal state,
wherein generating the plurality of watchdog signals includes:
time-sequentially generating the plurality of watchdog signals; and
generating first, second, third, and fourth watchdog signals in accordance with first, second, third, and fourth tokens, respectively, the first token being allocated to a first module which initializes the MCU, the second token being allocated to a second module which inputs a signal and performs a decision logic, the third token being allocated to a third module which performs actuation and a fail-safe operation, the fourth token being allocated to a fourth module which stores and finishes a diagnostic trouble code (DTC).

5. The control method of claim 4, wherein each of the plurality of tokens is generated by a pseudo random number generating algorithm.

6. The control method of claim 4, wherein the watchdog apparatus is implemented in a main MCU, and the main MCU communicates with a sub MCU using Serial Peripheral Interface (SPI).

7. A watchdog apparatus in which a main micro-control unit (MCU) and a sub MCU are connected by Serial Peripheral Interface (SPI) communication, the apparatus comprising:
a token generating unit which generates a seed value and generates a plurality of tokens using the seed value;
a watchdog signal generating unit which generates a plurality of watchdog signals corresponding to the generated plurality of tokens, respectively; and
a signal determining unit which determines whether each of the generated watchdog signals is in a normal state,
wherein the watchdog signal generating unit generates the plurality of watchdog signals in accordance with a first token which is allocated to a module which initializes the MCU, a second token which is allocated to a module which inputs a signal and performs a decision logic, a third token which is allocated to a module which performs actuation and a fail-safe operation, and a fourth token which is allocated to a module which stores and finishes a diagnostic trouble code (DTC), respectively.

* * * * *